United States Patent
Summer et al.

(10) Patent No.: US 9,026,250 B2
(45) Date of Patent: May 5, 2015

(54) HAPTIC MANIPULATION SYSTEM FOR WHEELCHAIRS

(75) Inventors: Matthew D. Summer, Melbourne, FL (US); Paul M. Bosscher, West Melbourne, FL (US); Laurance H. Davis, III, Malabar, FL (US)

(73) Assignee: Harris Corporation, Melbourne, FL (US)

(*) Notice: Subject to any disclaimer, the term of this patent is extended or adjusted under 35 U.S.C. 154(b) by 615 days.

(21) Appl. No.: 13/211,739

(22) Filed: Aug. 17, 2011

(65) Prior Publication Data

US 2013/0046438 A1    Feb. 21, 2013

(51) Int. Cl.
G06F 7/00 (2006.01)
B25J 13/02 (2006.01)
A61G 5/10 (2006.01)
A61G 5/04 (2013.01)

(52) U.S. Cl.
CPC ............. B25J 13/025 (2013.01); *A61G 5/04* (2013.01); *A61G 5/10* (2013.01); *A61G 2005/1051* (2013.01); *A61G 2005/1094* (2013.01); *A61G 2203/14* (2013.01); *A61G 2203/36* (2013.01); *Y10S 901/02* (2013.01); *Y10S 901/30* (2013.01); *Y10S 901/31* (2013.01); *Y10S 901/34* (2013.01)

(58) Field of Classification Search
CPC ........ B25J 9/1664; B25J 9/1689; B25J 13/08; B25J 13/081; B25J 13/082
USPC ............ 700/3, 245, 257, 260, 264; 901/2, 30, 901/94, 31, 4, 313; 74/490.01; 414/729
See application file for complete search history.

(56) References Cited

U.S. PATENT DOCUMENTS

| | | |
|---|---|---|
| 3,280,991 A | 10/1966 | Melton |
| 3,637,092 A | 1/1972 | George et al. |
| 4,216,467 A | 8/1980 | Colston |
| 4,521,685 A | 6/1985 | Rebman |
| 4,604,016 A | 8/1986 | Joyce |
| 4,655,673 A | 4/1987 | Hawkes |
| 4,661,032 A | 4/1987 | Arai |
| 4,762,006 A | 8/1988 | Asakawa et al. |
| 4,791,588 A | 12/1988 | Onda et al. |

(Continued)

FOREIGN PATENT DOCUMENTS

| | | |
|---|---|---|
| EP | 0672507 A1 | 9/1995 |
| EP | 1 876 505 A1 | 1/2008 |

(Continued)

OTHER PUBLICATIONS

Alqasemi et al., Maximizing Manipulation Capabilities for People with Disabilities Using a 9-DoF Wheelchair-Mounted Robotic Arm System, 2007, IEEE.*

(Continued)

*Primary Examiner* — Thomas G Black
*Assistant Examiner* — Sara Nelson
(74) *Attorney, Agent, or Firm* — Robert J. Sacco, Esq.; Fox Rothschild LLP (57) ABSTRACT

A robotic arm is mounted on a personal mobility device, such as a wheelchair, scooter or the like, and is controlled with a user input interface, also mounted on the personal mobility device. The user input interface has a grip operable by the user to move in a plurality of orthogonal directions, both spatially and angularly, having articulating arms supporting a housing with a pivot member.

22 Claims, 4 Drawing Sheets

(56) References Cited

U.S. PATENT DOCUMENTS

| | | | |
|---|---|---|---|
| 4,795,296 A * | 1/1989 | Jau | 414/5 |
| 4,837,734 A | 6/1989 | Ichikawa et al. | |
| 4,842,308 A | 6/1989 | Spotts | |
| 4,853,874 A | 8/1989 | Iwamoto et al. | |
| 4,860,215 A | 8/1989 | Seraji | |
| 4,862,751 A | 9/1989 | Asakawa et al. | |
| 4,893,981 A | 1/1990 | Yoshinada et al. | |
| 5,004,391 A | 4/1991 | Burdea | |
| 5,007,300 A | 4/1991 | Siva | |
| 5,018,922 A | 5/1991 | Yoshinada et al. | |
| 5,092,645 A | 3/1992 | Okada | |
| 5,184,319 A | 2/1993 | Kramer | |
| 5,193,963 A | 3/1993 | McAffee et al. | |
| 5,231,693 A | 7/1993 | Backes et al. | |
| 5,382,885 A | 1/1995 | Salcudean et al. | |
| 5,413,454 A * | 5/1995 | Movsesian | 414/729 |
| 5,430,643 A | 7/1995 | Seraji | |
| 5,451,924 A | 9/1995 | Massimino et al. | |
| 5,508,596 A | 4/1996 | Olsen | |
| 5,565,891 A | 10/1996 | Armstrong | |
| 5,589,828 A | 12/1996 | Armstrong | |
| 5,619,180 A | 4/1997 | Massimino et al. | |
| 5,648,897 A | 7/1997 | Johnson et al. | |
| 5,694,013 A | 12/1997 | Stewart et al. | |
| 5,737,500 A | 4/1998 | Seraji et al. | |
| 5,792,165 A | 8/1998 | Klieman et al. | |
| 5,831,408 A | 11/1998 | Jacobus et al. | |
| 6,028,593 A | 2/2000 | Rosenberg et al. | |
| 6,047,610 A | 4/2000 | Stocco et al. | |
| 6,084,587 A | 7/2000 | Tarr et al. | |
| 6,088,017 A | 7/2000 | Tremblay et al. | |
| 6,104,158 A | 8/2000 | Jacobus et al. | |
| 6,178,775 B1 * | 1/2001 | Higginbotham et al. | 62/646 |
| 6,184,868 B1 | 2/2001 | Shahoian et al. | |
| 6,191,796 B1 | 2/2001 | Tarr | |
| 6,246,390 B1 | 6/2001 | Rosenberg | |
| 6,271,833 B1 | 8/2001 | Rosenberg et al. | |
| 6,281,651 B1 | 8/2001 | Haanpaa et al. | |
| 6,522,952 B1 | 2/2003 | Arai et al. | |
| 6,535,793 B2 | 3/2003 | Allard | |
| 6,592,315 B2 * | 7/2003 | Osborne, Jr. | 414/9 |
| 6,636,161 B2 | 10/2003 | Rosenberg | |
| 6,705,871 B1 | 3/2004 | Bevirt et al. | |
| 6,781,569 B1 | 8/2004 | Gregorio et al. | |
| 6,793,653 B2 * | 9/2004 | Sanchez et al. | 606/1 |
| 6,801,008 B1 | 10/2004 | Jacobus et al. | |
| 6,857,878 B1 | 2/2005 | Chosack et al. | |
| 7,138,981 B2 | 11/2006 | Kim et al. | |
| 7,158,112 B2 | 1/2007 | Rosenberg et al. | |
| 7,168,748 B2 | 1/2007 | Townsend et al. | |
| 7,208,900 B2 | 4/2007 | Carlson et al. | |
| 7,225,404 B1 | 5/2007 | Zilles et al. | |
| 7,345,672 B2 | 3/2008 | Jacobus et al. | |
| 7,480,600 B2 | 1/2009 | Massie et al. | |
| 7,714,895 B2 | 5/2010 | Pretlove et al. | |
| 7,783,384 B2 | 8/2010 | Kraft | |
| 7,933,667 B2 | 4/2011 | Sjoberg et al. | |
| 8,226,072 B2 | 7/2012 | Murayama | |
| 8,373,391 B1 | 2/2013 | Allen et al. | |
| 8,447,440 B2 | 5/2013 | Phillips et al. | |
| 8,473,101 B2 | 6/2013 | Summer | |
| 2001/0002098 A1 | 5/2001 | Haanpaa et al. | |
| 2001/0037163 A1 | 11/2001 | Allard | |
| 2003/0169235 A1 | 9/2003 | Gron et al. | |
| 2004/0189675 A1 | 9/2004 | Pretlove et al. | |
| 2004/0254771 A1 | 12/2004 | Riener et al. | |
| 2005/0087373 A1 | 4/2005 | Wakitani et al. | |
| 2005/0252329 A1 | 11/2005 | Demers | |
| 2006/0048364 A1 | 3/2006 | Zhang et al. | |
| 2006/0066574 A1 * | 3/2006 | Kim et al. | 345/161 |
| 2006/0117258 A1 | 6/2006 | Yu | |
| 2006/0178775 A1 | 8/2006 | Zhang et al. | |
| 2007/0013336 A1 | 1/2007 | Nowlin et al. | |
| 2007/0050139 A1 | 3/2007 | Sidman | |
| 2007/0095582 A1 * | 5/2007 | Stuijt et al. | 180/65.1 |
| 2008/0009971 A1 | 1/2008 | Kim et al. | |
| 2008/0063400 A1 | 3/2008 | Hudson et al. | |
| 2008/0161733 A1 | 7/2008 | Einav et al. | |
| 2008/0266254 A1 | 10/2008 | Robbins et al. | |
| 2009/0074252 A1 | 3/2009 | Dariush et al. | |
| 2009/0182436 A1 | 7/2009 | Ferrara | |
| 2009/0234499 A1 * | 9/2009 | Nielsen et al. | 700/250 |
| 2010/0019890 A1 | 1/2010 | Helmer et al. | |
| 2010/0023185 A1 * | 1/2010 | Terwelp et al. | 701/2 |
| 2010/0041991 A1 | 2/2010 | Roundhill | |
| 2010/0070079 A1 | 3/2010 | Mangaser et al. | |
| 2010/0084513 A1 * | 4/2010 | Gariepy et al. | 244/190 |
| 2010/0092267 A1 | 4/2010 | Najdovski et al. | |
| 2010/0100256 A1 | 4/2010 | Jurmain et al. | |
| 2010/0168918 A1 | 7/2010 | Zhao et al. | |
| 2010/0169815 A1 | 7/2010 | Zhao et al. | |
| 2010/0172733 A1 * | 7/2010 | Chalubert et al. | 414/730 |
| 2010/0259614 A1 * | 10/2010 | Chen | 348/148 |
| 2011/0015569 A1 | 1/2011 | Kirschenman et al. | |
| 2011/0046781 A1 | 2/2011 | Summer | |
| 2011/0106339 A1 * | 5/2011 | Phillips et al. | 701/2 |
| 2011/0144828 A1 * | 6/2011 | Chengalva | 701/2 |
| 2011/0155785 A1 | 6/2011 | Laurent et al. | |
| 2011/0257786 A1 * | 10/2011 | Caron L'Ecuyer et al. | 700/258 |
| 2012/0095619 A1 | 4/2012 | Pack et al. | |
| 2012/0150351 A1 | 6/2012 | Bosscher et al. | |
| 2012/0184955 A1 | 7/2012 | Pivotto et al. | |
| 2012/0185098 A1 | 7/2012 | Bosscher et al. | |
| 2012/0185099 A1 * | 7/2012 | Bosscher et al. | 700/264 |
| 2012/0294696 A1 * | 11/2012 | Summer et al. | 414/1 |
| 2012/0306741 A1 * | 12/2012 | Gupta | 345/156 |
| 2013/0328770 A1 | 12/2013 | Parham | |
| 2014/0031983 A1 | 1/2014 | Low et al. | |

FOREIGN PATENT DOCUMENTS

| | | | |
|---|---|---|---|
| FR | 2 898 824 A1 | | 9/2007 |
| GB | 2 228 783 A | | 9/1990 |
| GB | 2228783 A | * | 9/1990 |
| WO | 95 30571 A1 | | 11/1995 |
| WO | 03 055061 A1 | | 7/2003 |
| WO | 2006 016799 A1 | | 2/2006 |
| WO | 2007051000 A2 | | 5/2007 |
| WO | 2008 135978 | | 11/2008 |
| WO | 2010 040215 A1 | | 4/2010 |
| WO | 2010/085184 A1 | | 7/2010 |
| WO | 2011075093 | | 6/2011 |

OTHER PUBLICATIONS

Rocco, Development and testing of a new C-based algorithm to control a 9-degree-of-freedom wheelchair-mounted robotic-arm system, Jun. 1, 2010, USF.*

Tijsma et al., A framework of interface improvements for designing new user interfaces for the MANUS robot arm, 2005, IEEE.*

Information about Related Patents and Patent Applications, see section 6 of the accompanying Information Disclosure Statement Letter, which concerns Related Patents and Patent Applications.

Zarrad, W., et al., "Stability and Transparency Analysis of a Haptic Feedback Controller for Medical Applications", Proceedings of the 46th IEEE Conference on Decision and Control : New Orleans, LA, Dec. 12-14, 2007, IEEE, Piscataway, NJ, USA, Dec. 1, 2007, pp. 5767-5772.

Cheung, Y., et al., "Cooperative Control of a Multi-Arm System Using Semi-Autonomous Telemanipulations and Adaptive Impedance", Advanced Robotis, 2009. ICAR 2009. International Conference on, IEEE, Piscataway, NJ, USA, Jun. 22, 2009, pp. 1-7.

Suzuki, A., et al., "Performance conditioning of time delayed bilaterial teleoperation system by scaling down compensation value of communication disturbance observer", Advanced Motion Control, 2010, 11th IEEE International Conference On, IEEE, Piscataway, NJ, USA, Mar. 12, 2010, pp. 524-529.

Tzafestas, C., et al., "Adaptive impedance control in haptic teleoperation to improve transparency under time-delay", 2008 IEEE International Conference on Robotics and Automation. The Half-Day Workshop on: Towards Autonomous Agriculture of Tomorrow, IEEE-Piscataway, NJ, USA, Piscataway, NJ, USA, May 19, 2008, pp. 212-219.

(56) References Cited

OTHER PUBLICATIONS

International Search Report mailed May 23, 2012; Application Serial No. PCT/US2011/066873 in the name of Harris Corporation.
Everett L J et al; "Automatic Singularity Avoidance Using Joint Variations in Robot Task Modification", IEEE Robotics & Automation Magazine, IEEE Service Center, Piscataway, NJ, US, vol. 1, No. 3, Sep. 1, 1994, pp. 13-19, XP011420425.
Jonghoon Park et al.: "Reconstruction of Inverse Kinematic Solution Subject to Joint Kinematic Limits Using Kinematic Redundancy", Intelligent Robots and Systems '96, IROS 96, Proceedings of the 1996 L EEE/RSJ International Conference on Osaka, Japan, Nov. 4-8, 1996, New York, NY, USA, IEEE, US, vol. 2, 4, Nov. 1996, pp. 425-430, XP010212433.
Hamid Abdi et al: "Joint Velocity Redistribution for Fault Tolerant Manipulators", Robotics Automation and Mechatronics (RAM), 2010 IEEE Conference on, IEEE, Piscataway, NJ, USA, Jun. 28, 2010, pp. 492-497, XP031710198.
International Search Report mailed Jun. 28, 2012, Application Serial No. PCT/US2012/027475 in the name of Harris Corporation.
Marshall, W.C., et al., "A Testbed for Deisgn of User-Friendly, Multiple-Degree-of-Freedom, Manual Controllers", Scientific Honeyweller, Honeywell's Corporate. Minneapolis, US Jan. 1, 1993, pp. 78-86.
International Search Report dated Oct. 29, 2012; Application Serial No. PCT/US2012/034207 in the name of Harris Corporation.
International Search Report dated Jan. 15, 2013, Application Serial No. PCT/US2012/037751 in the name of Harris Corporation.
International Search Report mailed Jan. 4, 2013, International Application Serial No. PCT/US2012/058303 in the name of Harris Corporation.
Tas, NR, et al., "Technical Note: Design, fabrication and testing of laterally driven electrostatic motors employing walking motion and mechanical leverage", Journal of Micromechanics & Microengineering, Institute of Physics Publishing, Bristol, GB, vol. 13, No. 1, Jan. 1, 2003. N6-N15.
Rogers, JE., et al., "Bi-directional Gap Closing MEMS Actuator Using Timing and Control Techniquest", IEEE Industrial Electronics, IECON 2006—32nd Annual Conference on, IEEE, Piscataway, NJ USA Nov. 1, 2006, pp. 3469-3154.
Alqasemi R et al: "Kinematics, control and redundancy resolution of a 9-DoF wheelchair-mounted robotic arm system for ADL tasks",Mechatronics and Its Applications, 2009. ISMA '09. 6th International Symposium on, IEEE, Piscataway, NJ, USA, Mar. 23, 2009, pp. 1-7.
Tsumaki Y et al: "Design of a compact 6-DOF haptic interface", Robotics and Automation, 1998. Proceedings. 1998 IEEE International Conference on Leuven, Belgium May 16-20, 1998, New York, NY, USA, IEEE, US, vol. 3, May 16, 1998, pp. 2580-2585.
Bley F et al: "Supervised navigation and manipulation for impaired wheelchair users", Systems, Man and Cybernetics, 2004 IEEE International Conference on, IEEE, Piscataway, NJ, USA, vol. 3, Oct. 10, 2004, pp. 2790-2796.
International Search Report mailed May 2, 2013, International Application No. PCT/US2012/051314, in the name of Harris Corporation.
European Search Report mailed Mar. 14, 2012, Application Serial No. 11009319.2-2316, in the name of Harris Corporation.
International Search Report mailed May 12, 2014, Application Serial No. PCT/US2013/069071, in the name of Harris Corporation.

\* cited by examiner

FIG. 4

HAPTIC MANIPULATION SYSTEM FOR WHEELCHAIRS

STATEMENT OF THE TECHNICAL FIELD

The inventive arrangements relate generally to wheelchair-mounted robotic arms. More particularly, the invention concerns haptic interfaces for wheelchair-mounted robotic arms.

DESCRIPTION OF THE RELATED ART

As of 2002, somewhere between 2.8 and 3.4 million Americans were users of wheelchairs or scooters. Approximately 85% of these users employed manual wheelchairs, 10% used electric wheelchairs, and 5% used scooters. A significant inconvenience for many users of such personal mobility devices is that, despite having adequate motor skills, they lack the reach, strength or both to perform simple everyday tasks. Simply put, the physical situation and positioning of users of such personal mobility devices may make it impractical or even impossible to reach objects that are otherwise easily accessible to those not so confined. As a result, many users of such personal mobility devices have difficulty functioning outside of spaces specifically designed for the disabled.

In response to this need, robotic arms have been developed for attachment to such personal mobility devices, i.e., to wheelchairs and scooters. The purpose of such robotic arms is to assist the user in manipulation tasks that are otherwise inconvenient or impossible for the user. By way of example, Exact Dynamics of Didam, The Netherlands, sells a product termed the iARM that can be mounted on a scooter or wheelchair to assist physically disabled users. Such systems employ an interface that uses a keypad, a joystick or even single-button controls.

A significant drawback of such systems is that it is difficult to control the robotic arm with such user interfaces. Joystick control of a robotic arm can be counterintuitive and clumsy, and the lack of any haptic feedback means that fine sensory control of the robotic arm is impossible. For example, the user cannot "feel" how hard the gripper of the arm is grasping an object, or tell when the arm has struck or is pushing against an object.

It would therefore be desirable to provide intuitive, haptic interfaces for robotic arms that are suitable for use on wheelchairs and scooters.

SUMMARY OF THE INVENTION

The invention concerns a personal mobility device which includes a robotic arm. The robotic arm and a user input interface are secured to the personal mobility device by suitable mechanical means such as a bracket, mechanical fasteners or the like. The user input interface includes a grip operable by a user to move in two or more orthogonal directions. At least one sensor is configured for measuring movement of the grip in a plurality of orthogonal directions. A control unit is provided that is responsive to a plurality of sensor signals produced by the at least one sensor. The control unit uses these sensor signals for generating output control signals. The output control signals are configured to control movement of at least one movable device in a plurality of orthogonal directions. More particularly, the control unit is operable to implement at least two states. In a first state, the output control signals are configured to exclusively control a motion of a motorized vehicle base portion of the personal mobility device. In a second state, the control signals are configured to exclusively control a motion of a robotic arm attached to the personal mobility device.

According to another aspect, the invention includes a method for controlling a personal mobility system including a motorized vehicle base and a robotic arm. The method involves determining movement of an input device in a plurality of orthogonal directions to generate corresponding output control signals. The method also includes selecting one of at least two states to control the personal mobility system. When in a first state, the output control signals are generated to control the motorized vehicle base of the personal mobility system. When in the second state the output control signals are generated to control the robotic arm of the personal mobility system. The method also includes sending the output control signals to the personal mobility system.

According to another aspect, the invention concerns a personal mobility device which includes a robotic arm. The robotic arm is mechanically coupled to the personal mobility device. A user input interface device is also mechanically coupled to the personal mobility device. The user input interface includes a grip operable by a user to move in a plurality of orthogonal directions. For example, these orthogonal directions can include three orthogonal linear directions, and three orthogonal axes of rotation, for a total of six different directions. One or more sensors are provided and configured for measuring movement of the grip. A control unit is responsive to a plurality of sensor signals produced by the one or more sensor for generating output control signals. These output control signals are configured to control movement of the robotic arm in a plurality of orthogonal directions.

BRIEF DESCRIPTION OF THE DRAWINGS

Embodiments will be described with reference to the following drawing figures, in which like numerals represent like items throughout the figures, and in which.

DETAILED DESCRIPTION

The various embodiments of the present invention are described with reference to the attached figures, wherein like reference numbers are used throughout the figures to designate similar or equivalent elements. The figures are not drawn to scale and they are provided merely to illustrate the embodiments of the present invention. Several aspects of the invention are described below with reference to example applications for illustration. It should be understood that numerous specific details, relationships, and methods are set forth to provide a full understanding of the invention. One having ordinary skill(s) in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts can occur in different orders and/or concurrently with other acts or events. Furthermore, not all illustrated acts or events are required to implement a methodology in accordance with the present invention.

The present invention concerns user control interfaces for robotic arms mounted on personal mobility devices. As used herein, the phrase "personal mobility device" means a wheelchair or scooter that is used to allow a physically disabled person to transport or move their body from one location to another. In some embodiments, the personal mobility device can include a motorized vehicle base to permit the personal mobility device to move from place to place in accordance with a user control. Motorized wheelchairs and scooters for disabled individuals are well known and therefore will not be described here in detail.

Robotic arms mounted on personal mobility devices as described herein are used to assist physically disabled individuals to accomplish manual tasks, including, without reservation, the gripping of objects, the pushing or moving of objects, gestures and the like. The robotic arm may be conventional in nature but the user interface for controlling the robotic arm, discussed at length below, provides a more intuitive interaction for the user, thereby providing improved control and ease of use. The interface preferably includes one or more haptic feedback mechanisms that permits the user to feel resistance met by the arm, for example, or to feel how hard the gripper of the arm is grasping an object.

In an embodiment of the invention, the user interface includes a grip which is operable by a user to move in two or more orthogonal directions. For example, these orthogonal directions can include three orthogonal linear directions, and three orthogonal axes of rotation, for a total of six different directions. One or more sensors are provided in the user interface for measuring movement of the grip. A control unit is responsive to sensor signals produced by the sensors, and uses these sensor signals for generating output control signals. These output control signals are configured to control movement of a motorized vehicle base portion of the personal mobility device, or the robotic arm. In some embodiments of the invention, the control unit is operable to implement at least two states. In a first state, the output control signals are configured to exclusively control a motion of a motorized vehicle base portion of the personal mobility device. In a second state, the control signals are configured to exclusively control a motion of a robotic arm attached to the personal mobility device. A user actuated sensor or switch can be coupled to the control unit, to allow a user to control a transition between a the first state and the second state.

The control unit can also have a third operational state in which the output control signals are configured to automatically selectively control the vehicle base portion of the personal mobility device and the robotic arm. In this third operational state, the output control signals can optionally control the motorized vehicle base and the robotic arm concurrently as hereinafter described.

The single control interface is sufficient to direct all aspects of motorized vehicle base and/or the robotic arm. The control interface also facilitates intuitive and precise control over the robotic arm in three dimensions providing significant improvements over prior art controllers that employ multiple joysticks and buttons to control the robotic arm. The invention has advantages over conventional robotic arm control systems of the prior art that may require the user to use multiple hands, or move his or her hand from a first set of controls, such as a joystick, to a second set of controls physically removed from the first set, such as buttons. This arrangement offers a significant increase of convenience for the user, particularly for users that may have only the use of a single hand, as the user does not need to jump from one set of controls to another, but simply continues to grasp a single interface control grip to direct the robotic arm in all aspects of its operation. Convenience is further enhanced because the single control interface can also control the movement of the motorized vehicle base.

In preferred embodiments the interface includes haptic feedback (force/tactile feedback to the operator) mechanisms that act upon the user's hand, fingers or both in accordance with force sensors present on the robotic arm. In this manner, the interface permits the user to sense when the robotic arm is striking an object, how hard the robotic arm is pushing or pulling on an object, and how hard the grasping device of the arm is bearing down upon an object.

A preferred embodiment haptic user control interface comprises a combination of articulating arms that support a housing. The articulating arms are mounted to a base by means of hinges and the angular rotation of each hinge is measured to determine linear translational movement of the housing. This arrangement is coupled with a ball and socket type pivot arrangement provided in the housing. The ball and pivot arrangement is used to determine rotation of a grip (roll, pitch, yaw) relative to the base. The ball and pivot arrangement provides a means for measuring relative rotation of the grip about the housing. The grip can include a finger switch or trigger that permits control of the grasping device of the robotic arm. This finger switch is preferably biased based upon the gripping strength of the robotic gripper so as to provide corresponding haptic feedback to the user. The grip can also include one or more thumb switches that permit the interface to switch between various modes of operation or be used for other input and control purposes.

In an embodiment of the invention, an image sensor is disposed on the robotic arm, and a video display positioned at a location on the personal mobility device. The image sensor is operatively arranged so that image sensor signals are communicate to the video display device. Consequently, images detected by the image sensor can be displayed on the video display device. The image sensor is advantageously disposed proximate to a distal end of the robotic arm, proximate to a location where a robotic gripper is mounted. These and other inventive features will become more apparent as the discussion progresses.

Figure 1:
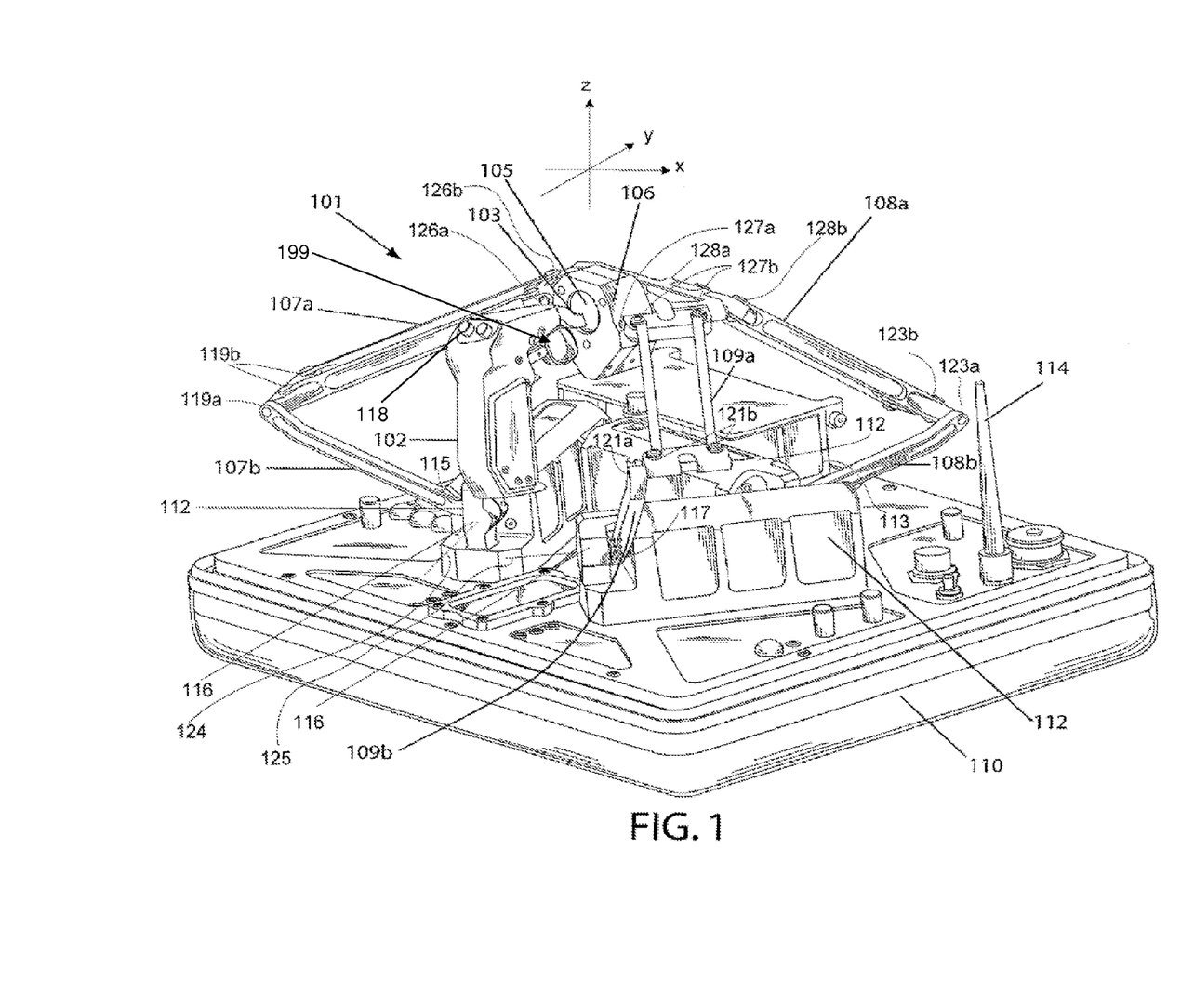
FIG. 1. is a perspective view of an embodiment interface device.

Referring now to FIG. 1, there is shown an interface 101 which is mounted upon a personal mobility device. Any suitable fastening device (not shown) can be used to attach the interface 101 to the personal mobility device. For example, a bracket and mechanical fasteners can be used for this purpose. The interface 101 is advantageously positioned at a location on the personal mobility device that is easily accessible to a person sitting in or on the personal mobility device. For example, in a wheelchair scenario the interface 101 can be located on or adjacent to an arm-rest of the wheelchair, so that the grip 102 can be easily accessed by a person's hand when the user is in the wheelchair. The interface 101 senses human control input gestures applied to the interface through the grip, and generates signals which can be used directly or indirectly to provide control signals for a robotic arm, which is also mounted on the personal mobility device.

The grip 102 is coupled via a ball joint 105 to a plurality of articulating arms 107a, 107b, 108a, 108b, and 109a, 109b, each of which is mounted at a base end 113, 115, 117 to an interface base 110 and coupled at an opposing end to a housing 106. Each base end 113, 115, 117 pivots on a single defined axis (e.g. 124, 125) in a hinge-like manner. The articulating arms 107a-109b are assembled from a plurality of gimbal joints which are operable to permit translational movement of the housing 106 in three orthogonal directions (x, y and z). More particularly, a center portion of the articulating arms 107a-109b can comprise a plurality of joints 119a, 119b, joints 121a, 121b, and joints 123a, 123b which permit arm rotation about two transverse axes. At a housing end of the arms joints 126a, 126b, 127a, 127b, and 128a, 128b also permit rotation about two transverse axes. The arrangement of the arms and related joints permit linear translation movement of housing 106 with respect to the x, y, and z orthogonal axes.

In preferred embodiments, while the joints of the articulating arms are arranged to permit such linear translational movement, they are arranged such that the housing 106 is prevented from rotating. In other words, pitch, roll and yaw of the housing 106 is generally precluded by the attachment of the articulating arms 107a, 107b, 108a, 108b, and 109a, 109b to the housing. This type of mechanism is known in the art as a "Delta" mechanism, and the translation-only behavior of the housing has been shown in Clavel, R., "Conception d'un robot parallèle rapide à 4 degrés de libertè," Ph.D. Thesis, EPFL, Lausanne, Switzerland, 1991.

At least one sensor of a first type is provided for measuring the linear translational movement of the housing 106. Any suitable means may be employed to generate the current x, y and z movement information of the housing 106 with respect to a reference frame defined by the base 110, including both optical and electro-mechanical sensors. By way of example, in one embodiment the first type sensors are a plurality of angle sensors 116 employed to respectively determine the angular movement of each joint. For example, one group of angle sensors 116 can determine the respective angular positions of the base ends 113, 115, 117 with respect to the base 110. Another group of angle sensors 116 may measure the angle of the joints 119a, 121a, 123a, while another group measures the angles of the joints 119b, 121b, 123b. Knowledge of the location of each joint 113, 115, 117 directly coupled to the base 110 combined with knowledge of the lengths of the arms 107a-109b and the angular positions of the joints 119, 121, 123 can be used to compute the location, movement or both of the housing 106 with respect to the base 110, using known trigonometric functions. Determining the movement, position or both of the housing 106 from the angle measurements provided by the joint angle sensors 116 is known in the art (see Clavel 1991). It should be understood that this is only one possible method of measuring the translational movement of the housing 106 and the invention is not limited with respect to the measurement method used.

A pivot member is disposed in the housing 106 and is arranged to pivot with regard to three angular axes about a single pivot point. In other words, the pivot member is configured to roll, pitch and yaw about the pivot point. Any suitable mechanical arrangement can be used to form such a pivot member. However, in a preferred embodiment, the pivot member can comprise a ball 105 including a ball surface which is at least partially spherical. The housing 106 can include a socket member for receiving the ball 105. A ball and socket arranged of this kind is described in further detail with respect to FIGS. 2A and 2B. A pin 103 is fixed to ball 105 and extends in a generally radial direction from the ball 105. The pin 103 is securely attached at one end to the grip 102 so that movement of the grip 102 is communicated to the ball 105. It will be appreciated that grip 102 is provided and is attached to the pivot member so that a user, upon grasping the grip 102, can cause the pivot member to rotate within the housing 106.

One or more second type sensors (not shown in FIG. 1) are mounted within housing 106 and can detect rotational motion of the ball 105 with regard to as many as three orthogonal axes (i.e., pitch, roll and yaw). The second type sensors can be any type sensor which is suitable to generate output signals which in combination allow the speed, direction or both of rotation of the ball 105 to be determined.

Output signals from the first and second type sensors are advantageously used to generate data regarding movement of the grip 102 with regard to any one of six directions. This data is then used to generate output control signals for a robotic arm mounted on the personal mobility device, as discussed in more detail below. More particularly, a control unit is provided which is responsive to a plurality of sensor signals produced by the first and second type sensors for generating output control signals. In some embodiments, this control unit can be disposed within the base 110; in other embodiments the control unit may be disposed near the power electronics for the personal mobility device, such as near the battery pack or the like. The output control signals generated by the control unit are configured to control the robotic arm mounted on the personal mobility device, a motorized vehicle base of the personal mobility device, or both.

Figure 2A:
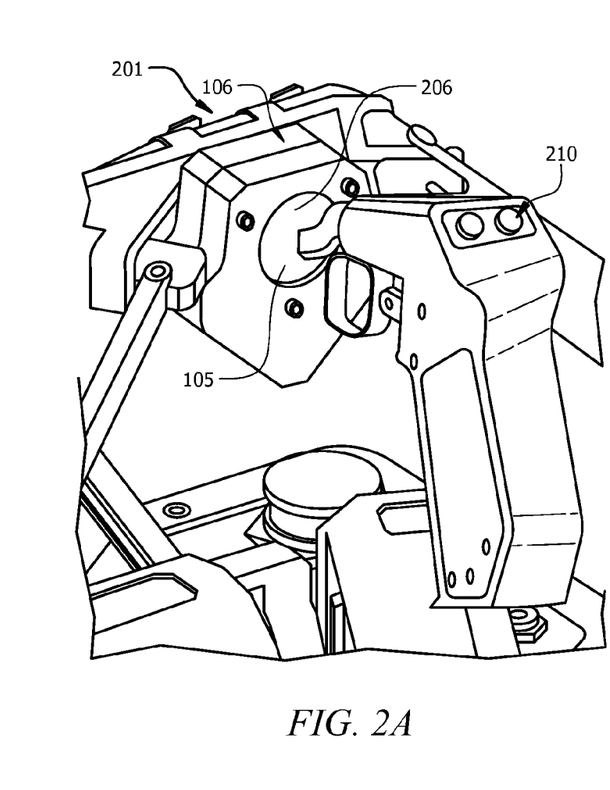
FIGS. 2A and 2B are detailed views of the interface device shown in FIG. 1.
Figure 2B:
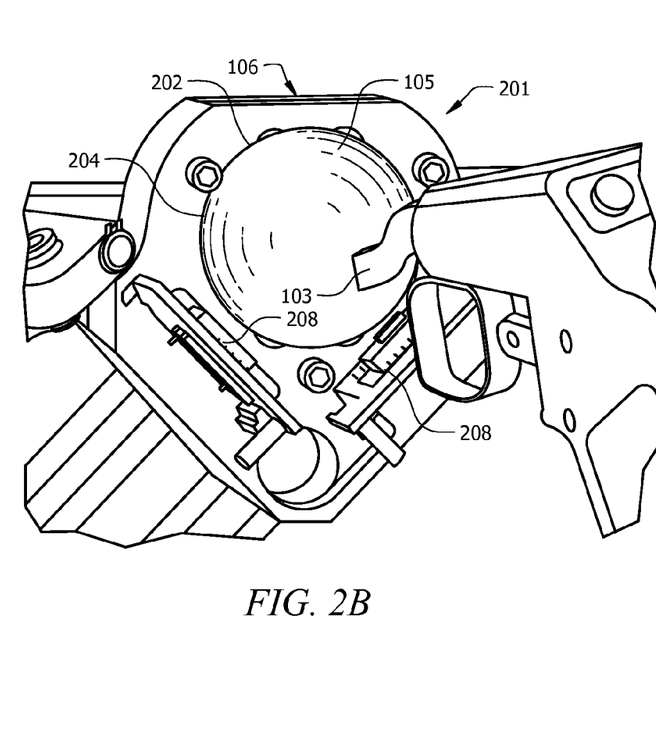

Referring now to FIGS. 2A and 2B, one embodiment of a pivot member and related structure is shown in greater detail. The pivot member includes housing 106 and ball 105 mounted therein so as to form a ball joint 201. The housing 106 is shown partially cut away in FIG. 2B to reveal a socket 202 defined within the housing 106 that is configured to accept ball 105. The socket 202 is at least partially spherical in shape. In preferred embodiments the ball 105 has a shape that is at least partially spherical in shape. The pivot member can pivot about a spherical center of the ball 105. In some embodiments, the external surface of the ball 105 is in direct mechanical contact or engagement with an inner surface 204 defined by the socket 202. As can be observed in FIG. 2B, the ball 105 is generally conformal to the inner surface 204 of the socket 202 and preferably fits snugly within the inner surface 204. According to some embodiments, the inner surface 204 forms a conjugate surface with respect to the outer surface of ball 105.

The housing 106 has an opening 206, which in some embodiments is circular; although it will be appreciated that other shapes can be used. Such an arrangement can be useful when desiring to limit movement of the ball 105 to an extent defined by the opening 206. The pin 103 extends through the opening 206 as shown. In some embodiments, the diameter of the opening 206 is advantageously formed somewhat smaller than the diameter of the ball 105 in order to retain the ball 105 inside the socket 202. In other embodiments, the size of the opening 206 can be larger than the diameter of the ball 105, and the ball joint 201 can further include a sealing cup (not shown) fitted around the opening 206 and having an opening that is smaller than the diameter of the ball 105. In some embodiments the sealing cup can be tapered in shape and sealingly connect with the sidewalls of the pin 103 so as to provide a protective cover that prevents debris from entering into the opening 206. The housing opening 206, the opening in the sealing cup, or both are dimensioned to allow the ball 105 to freely rotate within the limits defined by opening 206, the sealing cup, or both. In other words the ball 105 can roll, pitch and yaw within the socket 202.

The inner surface 204 can include a bearing surface (not shown) disposed inside the socket 202 to facilitate movement of the ball 105 in relation to the housing 106. The bearing surface in such embodiments can be detachably connected to the housing 106 or can be an integral part of the housing 106. The bearing surface can reduce friction between the ball 105 and the housing 106, which decreases wear and tear of the parts and extends the useful life of the ball joint 201. Preferably, the bearing surface is a low friction lining disposed between the socket 202 and the ball 105. However, other known means for reducing friction, such as bearings or fluids, can also be used to reduce friction in the devices disclosed herein instead of or in addition to the low friction lining.

Sensors 208 are provided for sensing and measuring the movement of the ball 105 relative to the housing 106. The sensors 208 are arranged so that they are collectively able to sense and measure rotation of the ball 105 with respect to as many as three orthogonal axes (roll, pitch and yaw). In preferred embodiments, the ball joint 201 includes at least two sensors 208. Each sensor 208 is preferably capable of sensing ball rotation in at least two orthogonal directions. When two or more sensors 208 are used in this way, it is preferable that they are spaced apart around the circumference of the ball 105 as shown. Such angular spacing can ensure that there is no ambiguity in the sensed rotation direction of the ball 105. According to some embodiments, the sensors 208 can be spaced apart by an angle of about 90° with respect to the center of the ball 105, but of course the invention is not limited in this regard. Optical sensors are particularly well suited for this purpose, but any sensor type may be employed, provided that it is capable of performing as described herein.

The first type sensors 116 and second type sensors 208, are electrically connected to control circuitry disposed, for example, within base 110 of the interface 101. Such control circuitry advantageously generates movement data for grip 102 by using information concerning rotation of ball 105 within the housing 106 and information regarding the movement of the articulating arms 107b, 108b, and 109b. This information is then used to generate control signals for controlling the robotic arm, motorized vehicle base, or both. A data link can be used for the purpose of communicating motion control command signals to the robotic arm and/or vehicle base. The data link can also be used to communicate haptic information from the robotic arm (as determined from corresponding force sensors on the robotic arm) to the control unit circuitry. In some embodiments, the interface 101 can have an integrated data transceiver contained therein. If a wireless data transceiver is used for this purpose, the interface 101 can include an antenna 114. Wired connections are also possible, however, and may be preferred in some cases to avoid electromagnetic interference disrupting operations of the robotic arm.

Figure 3:
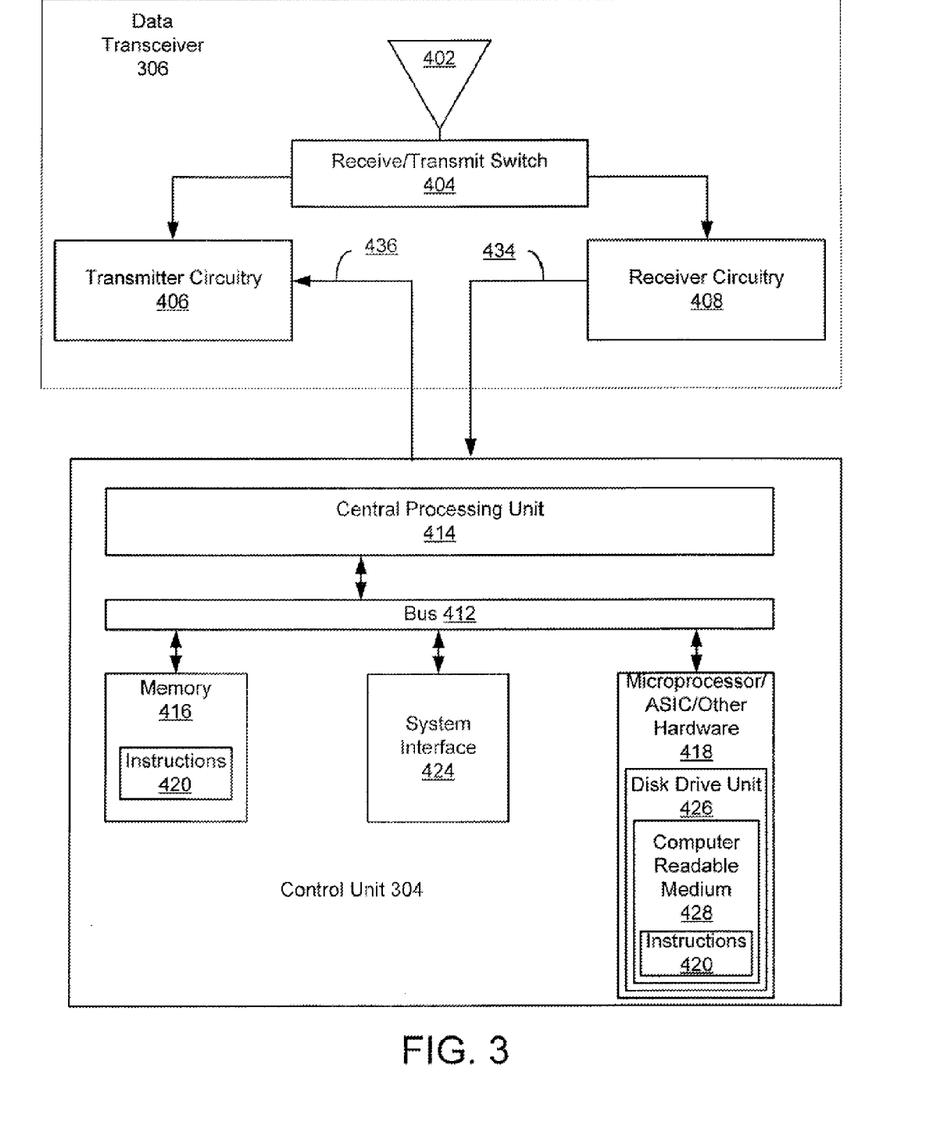
FIG. 3 illustrates a control unit for the interface shown in FIG. 1.

Referring now to FIG. 3, there is shown an embodiment control unit 304 which can be used in the present invention. User input signals generated by the interface 101 can be transmitted, such as by wires, to the control unit 304. The control unit 304 can be disposed within base 110, or at any suitable location on the personal mobility device, such as immediately adjacent to or on the battery pack for the personal mobility device. As shown in FIG. 3, the control unit 304 comprises a system interface 424, a Central Processing Unit (CPU) 414, a system bus 412, a memory 416 connected to and accessible by other portions of the control unit 304 through system bus 412, and hardware entities 418 connected to system bus 412. System interface 424 allows the control unit 304 to receive data from first and second type sensors 116, 208 and from thumb buttons 118 and trigger 199. The system interface 424 can also be configured to allow control unit 304 to communicate with data transceiver 306, network equipment and other computing devices via a wired, wireless or both communications link or links. At least some of the hardware entities 418 perform actions involving access to and use of memory 416, which may be a random access memory (RAM), a disk drive, and/or a compact disc read only memory (CD-ROM).

Hardware entities 418 can include microprocessors, application specific integrated circuits (ASICs) and other hardware. Hardware entities 418 may include a microprocessor programmed for facilitating the provision of data communication services and robot arm control processing as described herein. In this regard, it should be understood that the microprocessor can access and run robotic arm control processing as described herein. The communication operations can include, but are not limited to, signal receiving operations, signal processing operations, signal generation operations, and signal communication operations. Such communication operations can facilitate communications with the robotic arm to facilitate motion control of the robotic arm, communications with a motorized vehicle base, or both.

As shown in FIG. 3, the hardware entities 418 can include a disk drive unit 426 or other non-volatile memory (e.g., flash memory or ROM) comprising a computer-readable storage medium 428 on which is stored one or more sets of instructions 420 (e.g., software code). The instructions 420 can be configured to implement one or more of the methodologies, procedures, or functions described herein, such as generation of the output control signals for motion control of the robotic arm and/or motorized vehicle base, based upon inputs obtained from the interface 101. The instructions can also be configured for sending haptic control signals to the interface 101 based upon data obtained from the robotic arm. The instructions 420 can also reside, completely or at least partially, within the memory 416 and/or within the CPU 414 during execution thereof. The memory 416 and the CPU 414 also can constitute machine-readable media. The term "machine-readable media", as used herein, refers to a single medium or multiple media (e.g., a centralized or distributed database, and/or associated caches and servers) that store the one or more sets of instructions 420. The term "machine-readable media", as used here, also refers to any medium that is capable of storing, encoding or carrying a set of instructions 420 for execution that cause the control unit 304 to perform any one or more of the methodologies of the present disclosure. As evident from the above discussion, the control unit 304 implements one or more method embodiments of the present invention, and in particular enables a user to control movement of the robotic arm attached to the personal mobility device, or control the movement of a motorized vehicle base of the personal mobility device.

The interface 101 can communicate with the robotic arm and/or motorized vehicle base by using wired or wireless connections. A suitable data transceiver can be used for this purpose. For example, if a wireless connection is preferred, a wireless data transceiver 306 can be provided. Notably, the data transceiver 306 may include more or less components than those shown in FIG. 3. However, the components shown are sufficient to disclose an illustrative embodiment implementing the present invention.

If a wireless connection is used, then the data transceiver 306 can comprise an antenna 402 (shown as element 114 in FIG. 1) for receiving and transmitting Radio Frequency (RF) signals. A receive/transmit (Rx/Tx) switch 404 selectively couples the antenna 402 to the transmitter circuitry 406 and receiver circuitry 408 in a manner familiar to those skilled in the art. The receiver circuitry 408 decodes the RF signals received from the robotic arm to derive information therefrom; this can include haptic information that can be processed and provided as haptic information for the housing 106. The receiver circuitry 408 is coupled to control unit 304 via an electrical connection 434. The receiver circuitry 408 provides decoded RF signal information to the control unit 304. The control unit 304 uses the decoded RF signal information in accordance with the function(s) of the invention as described herein. In other embodiments a wired connection is made with the robotic arm and/or motorized vehicle base, as known in the art. Such a wired connection would be functionally equivalent to a wireless connection shown in FIG. 3 but is easier to implement with respect to the communications circuitry 404, 406, 408. The user interface 101, control unit 304, and data transceiver 306 can together comprise an interface control system that is used to control the robotic arm and motorized vehicle base of the personal mobility device.

Figure 4:
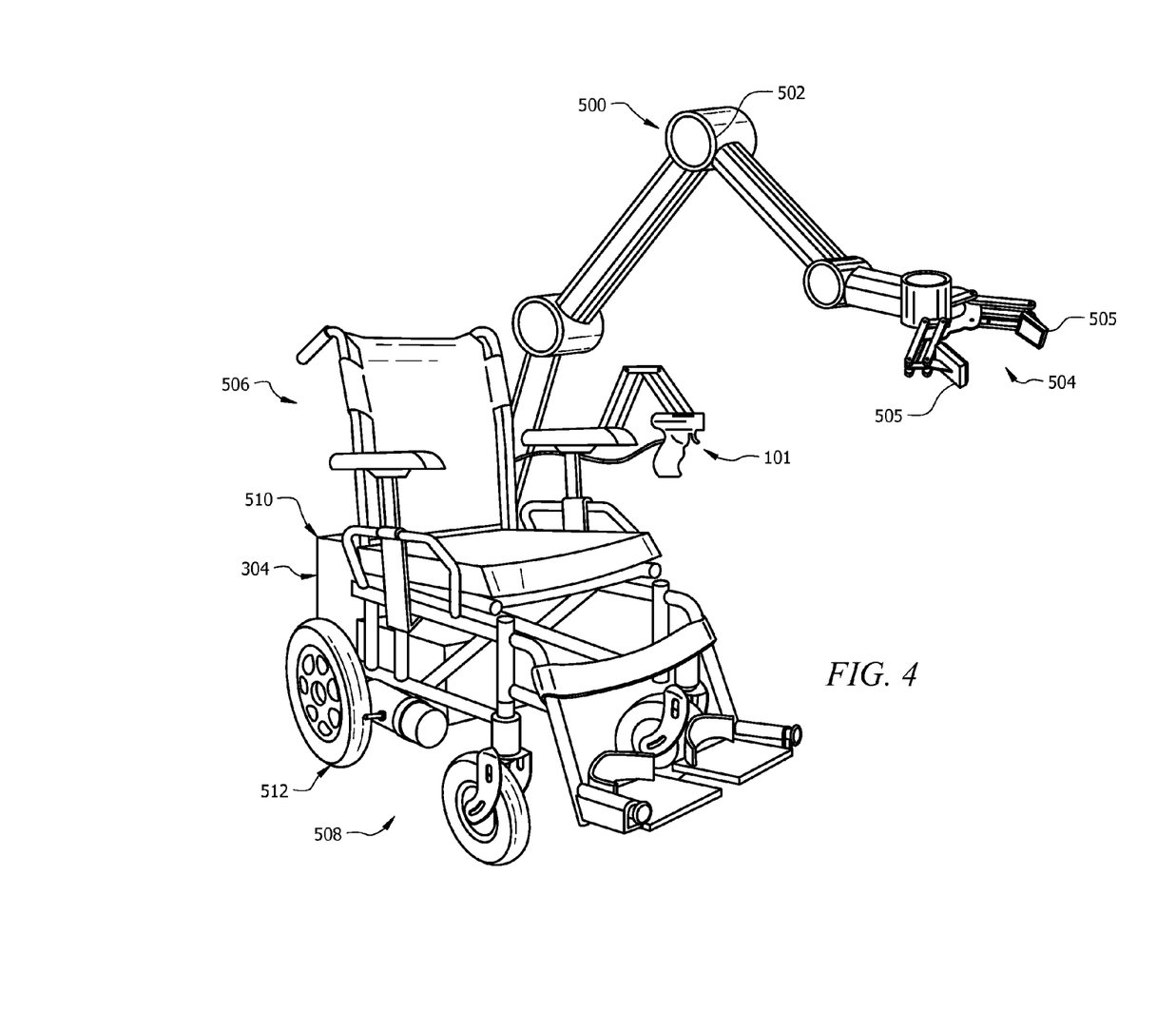
FIG. 4 is a perspective view of an embodiment personal mobility device.

With further reference to FIG. 4, the interface control system described above can be used to generate the output control signals that are used to control a robotic arm 500, or to control movement of a motorized vehicle base 508 of a personal mobility device 506. As shown in FIG. 5, the robotic arm 500 can be attached to the frame of the personal mobility device 506 using any conventional mounting structure, such as clamps, screws, bolts or the like. The robotic arm 500 is responsive to control signals for moving a gripper element in a plurality of orthogonal directions. For example, the robotic arm can be capable of moving the gripper in as many as three orthogonal linear directions, and in a plurality of rotational directions defined by as many as three orthogonal axes of rotation. Robotic arms as described herein are known in the art and therefore will not be described here in detail.

The robotic arm 500 can include a plurality of joints 502, each with a corresponding motor or driving device that sets the angular position of that joint 502 as instructed by the interface control system, and in particular in accordance with user input generated by the interface 101. More specifically, by transmitting appropriate output control signals the interface control system can direct the joints 502 to control the spatial positioning of the tip of a gripper 504 on the arm 500 in accordance with the spatial positioning of the housing 106, and control the angular positioning of the robotic gripper 504 in accordance with the angular positioning of the grip 102. Power used to activate the joints 502 can be provided, for example, from the control unit 304 that is electrically connected to the robotic arm 500. The control unit 304, in turn, can obtain power from a battery pack 510 or other power source mounted on the personal mobility device 506, which further powers a drive train 512 of the personal mobility device 506. The drive train 512 can be conventional in nature and provides the motive power for the moving the motorized vehicle base 508 of personal mobility device 506.

The gripper 504 can be a force-sensing gripper, such as the gripper disclosed in U.S. application Ser. No. 13/049,982, entitled "Robotic Grasping Device With Multi-Force Sensing At Base Of Fingers," filed on Mar. 17, 2011, the contents of which are included herein by reference. The gripper 504 includes fingers 505, the angular positions of which can be controlled to open or close relative to each other to grasp and release objects. The force-sensing gripper 504 can send haptic signals back to the control unit 304, as measured by, for example, the fingers 505, which in turn are used by the interface control system to control motive devices in the interface 101 to create a corresponding haptic feedback response for the user. This haptic feedback response can indicate, for example, the magnitude and direction of a force present on the gripper 504 that the robotic arm 500 senses. This could include, for example, a force that is placing a torque on the arm 500. This force can be felt by the user in the form of a corresponding resistance to motion of the grip 102 in the direction of this force, the resistance being proportional to the magnitude of the force impinging on the robotic arm 500. In this manner a user can sense, for example, the weight of an object, how hard the gripper 504 is pressing against a surface, and so forth. Additionally, the haptic signals can indicate how strongly the gripper 504 is grasping an object. If, for example, the angular positioning of the fingers 505 of the gripper 504 is determined by the displacement of the trigger 199, a haptic signal in the form of resistance to depression of the trigger 199 can be generated that is proportional to how hard the fingers 505 are bearing down upon an object being gripped. In this manner a user can determine how firmly an object is being grasped, and could thus handle, for example, an egg with a more gentle touch than the handling of a book.

One or more actuators, motors or servo motors (not shown) can be disposed in relation to the interface 101 to provide these haptic feedback signals via the interface 101, such as via grip 102 and trigger 199. For example, actuators or the like in the controller base 110 can apply a force to the articulating arms 107b, 108b, and 109b, which is then experienced in the grip 102. More particularly, such actuators or motors can be disposed in motor housings 112 which are provided as part of base 110. The force generated by the motors is used to provide haptic feedback to the user. Additional actuators for providing haptic feedback to a user can be provided within grip 102 itself. For example, such an actuator can exert a force upon the trigger 199 as discussed above.

The personal mobility device 506 provides an easy and intuitive user interface 101 to control the robotic arm 500, and as such provides a system that augments the physical capabilities of a user confined to a personal mobility device, permitting the user to grasp and manipulate objects with the robotic arm 500 that might otherwise be difficult or even impossible for the user. Force feedback as provided by the haptic interface 101 enables more subtle manipulation of objects with the gripper 504, for example by avoiding the inadvertent crushing of objects, or permits the user to feel when the robotic arm 500 is brushing against or bumping into an object and to sense the weight of an object being lifted. Further, the robotic arm 500 and related control systems can provide a safety feature in the form of collision avoidance and limiting the forces exerted by the robotic arm.

One or more sensors can be provided on the user interface 101 to transition the user interface from a first state to a second state. In the first state, the user interface can exclusively control motion of the motorized base 508 of personal mobility device 506. In the second state the user interface can exclusively control motion of the robotic arm 500. A user actuated sensor coupled to the control unit can facilitate transitioning the control unit between at least the first state and the second state in response to a user actuation. The user actuated sensor can be disposed anywhere on the user interface 101, but in a preferred embodiment is provided on the grip 102. For example, with reference to FIG. 2, the user actuated sensor can be a push-button switch. 210. Still, the invention is not limited in this regard and other sensor arrangements are also possible.

The control unit 304 can also be configured to have a third operating state in which the control unit automatically selectively generates control signals which control the motorized vehicle base portion of the personal mobility device and/or the robotic arm. Such state is sometimes referred to herein as a dual use operating state. In such state, movement information generated by the sensors in control unit 101 is used to control both the motorized vehicle base 508 of the personal mobility device, and the robotic arm 500. Specifically, the dual-use mode is primarily used to control the robotic arm 500. In this mode, if the user attempts to move or extend the robotic arm 500 to a location that is beyond the maximum reach of the robotic arm 500, the control unit 304 will automatically generate movement commands for the drive train of the motorized vehicle base 508 to cause the motorized vehicle base to move in the direction specified by the user for the robotic arm 500. By way of example, consider the case where the user is pushing the grip 102 forward along the direction of the Y-axis to cause the gripper to reach a target position. Assume also that the robotic arm 500 is incapable of further forward movement towards the target position. In other words, assume that the target position is beyond the maximum extended reach of the gripper 504 disposed on the end of the robotic arm 500. In this scenario, the control unit 304 can generate movement commands for the motorized vehicle base 508 that causes the motorized vehicle base to move forward. This movement of the motorized vehicle base 508 can stop when, for example, the user pulls the housing 106 back a predetermined distance along the Y-direction. In that case, the motorized vehicle base 508 becomes substantially closer along the Y-direction with respect to the target position, thereby affording the robotic arm 500 an ability to reach the target position.

All of the apparatus, methods and algorithms disclosed and claimed herein can be made and executed without undue experimentation in light of the present disclosure. While the invention has been described in terms of preferred embodiments, it will be apparent to those of skill in the art that variations can be applied to the apparatus, methods and sequence of steps of the method without departing from the concept, spirit and scope of the invention. More specifically, it will be apparent that certain components can be added to, combined with, or substituted for the components described herein while the same or similar results would be achieved. All such similar substitutes and modifications apparent to those skilled in the art are deemed to be within the spirit, scope and concept of the invention as defined.

We claim:

1. A personal mobility device, comprising:
    a robotic arm mechanically coupled to the personal mobility device and having a grasping device disposed at a distal end thereof;
    a single input device mechanically coupled to the personal mobility device and having an elongate hand grip operable by a user to move in a plurality of orthogonal directions;
    at least one sensor configured to measure movement of the elongate hand grip in a plurality of orthogonal directions;
    a control unit responsive to a plurality of sensor signals produced by the at least one sensor for generating output control signals configured to control movement, the control unit operable to implement at least three states comprising:
       a first state in which the output control signals exclusively control a motion of a motorized vehicle base portion of the personal mobility device;
       a second state in which the output control signals exclusively control a motion of a robotic arm attached to the personal mobility device; and
       a third state in which the output control signals automatically selectively control the motorized vehicle base portion of the personal mobility device and the robotic arm; and
    a user actuated sensor disposed on said elongate hand grip and electrically coupled to the control unit, wherein the control unit is configured to transition between the first, second and third states in response to a first user actuation of said user actuated sensor.

2. The personal mobility device according to claim 1, further comprising an image sensor disposed on said robotic arm, and a video display positioned at a location on said personal mobility device and configured to display images detected by said image sensor.

3. The personal mobility device according to claim 2, wherein said image sensor is disposed proximate to a distal end of said robotic arm to which a robotic gripper is mounted.

4. The personal mobility device according to claim 1, wherein said plurality of orthogonal directions include three orthogonal linear directions, and three orthogonal axes of rotation.

5. The personal mobility device according to claim 4, wherein the single input device comprises:
    a plurality of articulating arms, each mounted at a base end to an interface base and coupled at an opposing end to a housing, said plurality of articulating arms operable for translational movement of said housing in three orthogonal directions;
    a pivot member disposed in said housing arranged to pitch, roll and yaw about a single pivot point;
    said elongate hand grip attached to said pivot member; and
    wherein said at least one sensor includes at least one first sensor configured for measuring said linear translational movement, and at least one second sensor configured to detect pitch, roll and yaw motion of said pivot member about said pivot point produced by motion of said elongate hand grip.

6. The personal mobility device according to claim 1, further comprising at least one motive device configured to apply a force to the elongate hand grip.

7. The personal mobility device according to claim 6, wherein data received by the control unit from the robotic arm is used by the control unit to control said force applied by said at least one motive device to provide haptic feedback to the user of the single input device.

8. A personal mobility device, comprising:
    a robotic arm mechanically coupled to the personal mobility device and having a grasping device disposed at a distal end thereof;
    a single input device mechanically coupled to the personal mobility device and having an elongate hand grip operable by a user to move in a plurality of orthogonal directions;
    a trigger disposed on the elongate hand grip so as to be physically displaceable by the user in a radial direction, transverse to a longitudinal axis of the elongate hand grip, where a position or velocity of the grasping device is controlled in accordance with a physical displacement of said trigger;
    at least one sensor configured to measure movement of the elongate hand grip in a plurality of orthogonal directions;
    a control unit responsive to a plurality of sensor signals produced by the at least one sensor for generating output control signals configured to control movement, the control unit operable to implement at least three states comprising:
       a first state in which the output control signals are configured to exclusively control a motion of a motorized vehicle base portion of the personal mobility device;
       a second state in which the output control signals are configured to exclusively control a motion of a robotic arm attached to the personal mobility device;
       a third state in which the output control signals are configured to automatically selectively control the motorized vehicle base portion of the personal mobility device and the robotic arm; and a user actuated sensor disposed on said elongate hand grip and electrically coupled to the control unit, wherein the control unit is configured to transition between the first state, the second state and the third state in response to a first user actuation of said user actuated sensor.

9. A method for controlling a personal mobility system comprising a motorized vehicle base and a robotic arm with a grasping device disposed at a distal end thereof, comprising:
determining movement of an elongate hand grip of a single input device in a plurality of orthogonal directions to generate corresponding first output control signals;
determining physical displacement of a trigger disposed on the elongate hand grip by a user in a radial direction, transverse to a longitudinal axis of the elongate hand grip, to generate corresponding second output control signals for controlling a position or a velocity of the robotic gripper;
transitioning between at least three states to control the personal mobility system in response to a first user actuation of a user actuated sensor disposed on said elongated hand grip, wherein when in a first state the first output control signals are generated to control the motorized vehicle base of the personal mobility system, when in the second state the first output control signals are generated to control the robotic arm of the personal mobility system, and when in a third state in which the first output control signals are used to automatically selectively control the motorized vehicle base and the robotic arm; and
sending the first and second output control signals to the personal mobility system;
wherein when in the first state the first output control signals are used to exclusively control the motorized vehicle base, and when in the second state the first output control signals are used to exclusively control the robotic arm.

10. A method for controlling a personal mobility system comprising a motorized vehicle base and a robotic arm with a grasping device disposed at a distal end thereof, comprising:
determining movement of an elongate hand grip of a single input device in a plurality of orthogonal directions to generate corresponding first output control signals;
transitioning between at least three states to control the personal mobility system in response to a first user actuation of a user actuated sensor disposed on said elongated hand grip, wherein when in a first state the first output control signals are generated to control the motorized vehicle base of the personal mobility system, when in a second state the first output control signals are generated to control the robotic arm of the personal mobility system, and when in a third state the first output control signals are generated to automatically and selectively control the motorized vehicle base of the personal mobility system and the robotic arm; and
sending the first output control signals to the personal mobility system.

11. The method according to claim 10 wherein determining movement of the input device comprises:
determining a linear translation movement of a housing in three orthogonal directions; and
determining roll, pitch and yaw motion of a pivot member coupled to said housing; and
wherein at least a portion of the linear translation movement and the roll, pitch and yaw motion are used to generate said first output control signals.

12. The method according to claim 10, wherein when in the first state the first output control signals are used to exclusively control the motorized vehicle base, and when in the second state the first output control signals are used to exclusively control the robotic arm.

13. The method according to claim 10, wherein said plurality of orthogonal directions include three orthogonal linear directions, and three orthogonal axes of rotation.

14. The method according to claim 10, further comprising applying a force to the single input device to provide haptic feedback related to the personal mobility system to a user.

15. The method according to claim 14, further comprising receiving data from the robotic arm and using the data to control said force applied to the single input device.

16. The method according to claim 10, further comprising;
capturing an image at a distal end of said robotic arm proximate to the robotic gripper; and
displaying said captured image on a display unit mounted to said personal mobility device.

17. A personal mobility device, comprising:
a robotic arm mechanically coupled to the personal mobility device and having a grasping device disposed at a distal end thereof;
a single input device mechanically coupled to the personal mobility device and having an elongate hand grip operable by a user to move in a plurality of orthogonal directions, where the plurality of orthogonal directions include three orthogonal linear directions, and three orthogonal axes of rotation, for a total of six different directions;
at least one sensor configured to measure movement of the single input device in said plurality of orthogonal directions;
a control unit responsive to a plurality of sensor signals produced by the at least one sensor for generating output control signals configured to control movement of said robotic arm in said plurality of orthogonal directions; and
a user actuated sensor disposed on said elongate hand grip and electrically coupled to the control unit so as to cause the control unit to transition between a first state, a second state and a third state in response to a user actuation of the user actuated sensor;
wherein the output control signals are configured in the first state to exclusively control a motion of a motorized vehicle base portion of the personal mobility device, configured in the second state to exclusively control a motion of a robotic arm attached to the personal mobility device, and configured in the third state to automatically and selectively control the motorized vehicle base portion of the personal mobility device and the robotic arm.

18. The personal mobility device according to claim 17, further comprising an image sensor disposed on said robotic arm, and a video display positioned at a location on said personal mobility device configured to display images detected by said image sensor.

19. The personal mobility device according to claim 18, wherein said image sensor is disposed proximate to a distal end of said robotic arm to which a robotic gripper is mounted.

20. The personal mobility device according to claim 17, further comprising at least one motive device configured to apply a force to the elongate hand grip.

21. The personal mobility device according to claim 20, wherein data received by the control unit from the robotic arm is used by the control unit to control said force applied by said at least one motive device to provide haptic feedback to the user of the single input device.

22. The personal mobility device according to claim 18, wherein the single input device comprises:

a plurality of articulating arms, each mounted at a base end to an interface base and coupled at an opposing end to a housing, said plurality of articulating arms operable for translational movement of said housing in three orthogonal directions;

a pivot member disposed in said housing arranged to pitch, roll and yaw about a single pivot point;

said elongate hand grip attached to said pivot member; and wherein said at least one sensor includes at least one first sensor configured to measure said linear translational movement, and at least one second sensor configured to detect pitch, roll and yaw motion of said pivot member about said pivot point produced by motion of said elongate hand grip.

* * * * *